(12) United States Patent
Reid-Robertson et al.

(10) Patent No.: US 7,303,079 B2
(45) Date of Patent: Dec. 4, 2007

(54) SCREENING ELEMENT

(75) Inventors: Johan Theodore Reid-Robertson, Roodepoort (ZA); Angelo Marietta, Boksburg (ZA); Franz Zavier Mahl, deceased, late of Kempton Park (ZA); by Anneke Denise Le Roux, legal representative, Kempton Park (ZA); Charles Wynand Louw, Kempton Park (ZA)

(73) Assignee: RCM Plastics CC, Boksburg (ZA)

( * ) Notice: Subject to any disclaimer, the term of this patent is extended or adjusted under 35 U.S.C. 154(b) by 0 days.

(21) Appl. No.: 10/500,871

(22) PCT Filed: Jan. 8, 2003

(86) PCT No.: PCT/ZA03/00003

§ 371 (c)(1),
(2), (4) Date: Apr. 18, 2005

(87) PCT Pub. No.: WO03/057376

PCT Pub. Date: Jul. 17, 2003

(65) Prior Publication Data

US 2006/0096895 A1    May 11, 2006

(30) Foreign Application Priority Data

Jan. 8, 2002   (ZA)   .................................. 2002/0140
Feb. 20, 2002  (ZA)   .................................. 2002/1450

(51) Int. Cl.
*B07B 1/49*   (2006.01)

(52) U.S. Cl. ...................... 209/405; 209/392; 209/397; 209/404; 209/412; 209/413

(58) Field of Classification Search ................ 209/392, 209/397, 399, 404, 405, 409, 413, 660, 674, 209/675, 680, 408, 412
See application file for complete search history.

(56) References Cited

U.S. PATENT DOCUMENTS

| | | | | |
|---|---|---|---|---|
| 2,870,910 A * | 1/1959 | Welmer | ...................... | 209/396 |
| 3,351,228 A * | 11/1967 | Huisman | ..................... | 220/607 |
| 4,563,270 A * | 1/1986 | Wolff | ......................... | 209/379 |
| 4,674,251 A * | 6/1987 | Wolff | ...................... | 52/309.15 |
| 4,857,176 A * | 8/1989 | Derrick et al. | .............. | 209/392 |
| 5,372,261 A | 12/1994 | Galton | | |
| 6,202,857 B1 | 3/2001 | Keller | | |
| 6,714,121 B1 * | 3/2004 | Moore | ........................ | 340/10.3 |

FOREIGN PATENT DOCUMENTS

EP    0 296 273    12/1988

* cited by examiner

*Primary Examiner*—Patrick Mackey
*Assistant Examiner*—Mark Hageman
(74) *Attorney, Agent, or Firm*—Young & Thompson

(57) ABSTRACT

The invention provides a screen which has a screen body (12) and a plurality of ribs which extend across the screen body. Screening apertures (118) are defined in the screen body by the ribs. A reinforcing frame (124) is embedded in the screen body, which frame is made of a first plastics material which has a greater density than a second plastics material from which the screen body (12) is made. The frame has keying formations formed therein to assist in bonding between the frame and the screen body.

16 Claims, 5 Drawing Sheets

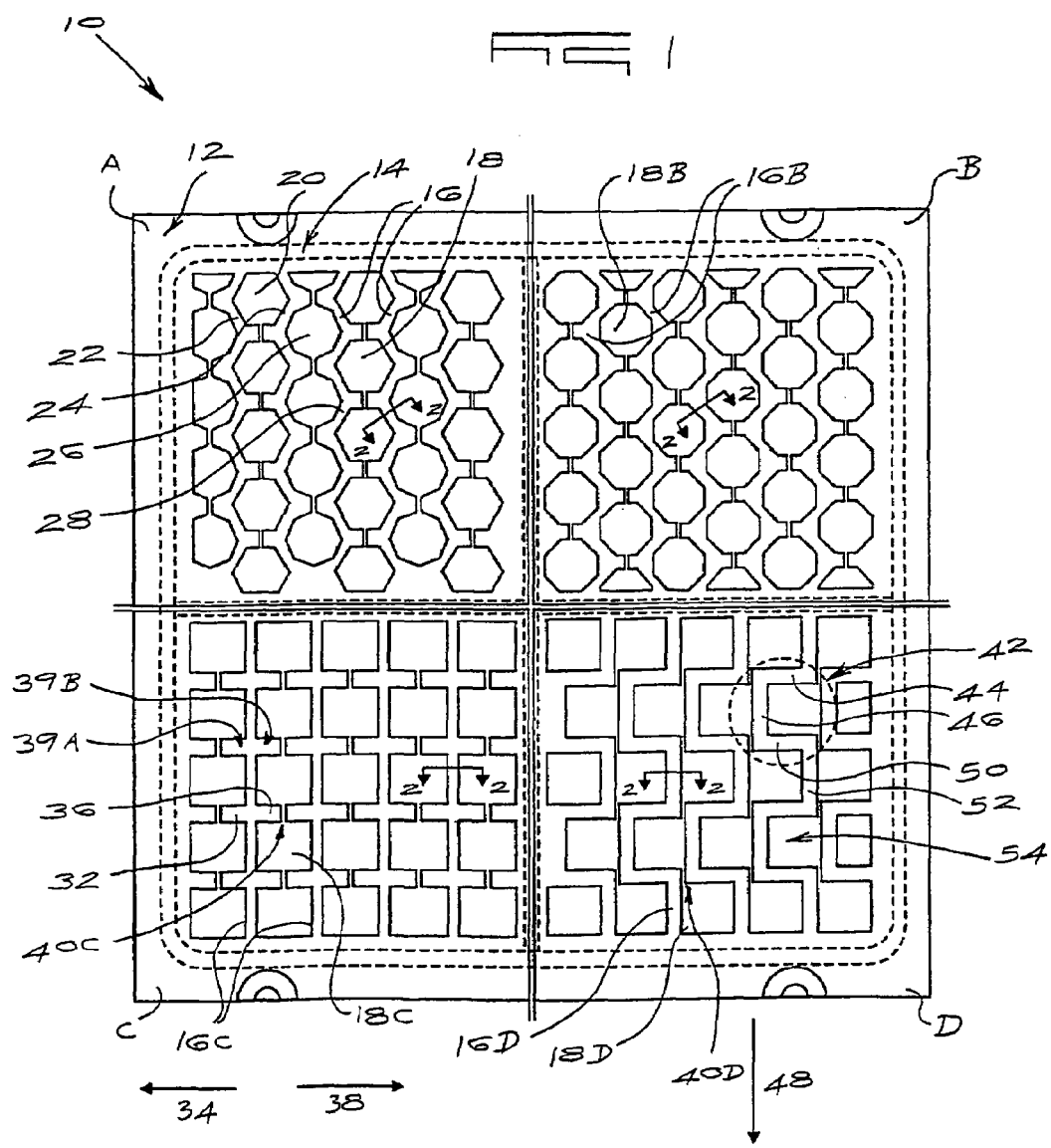

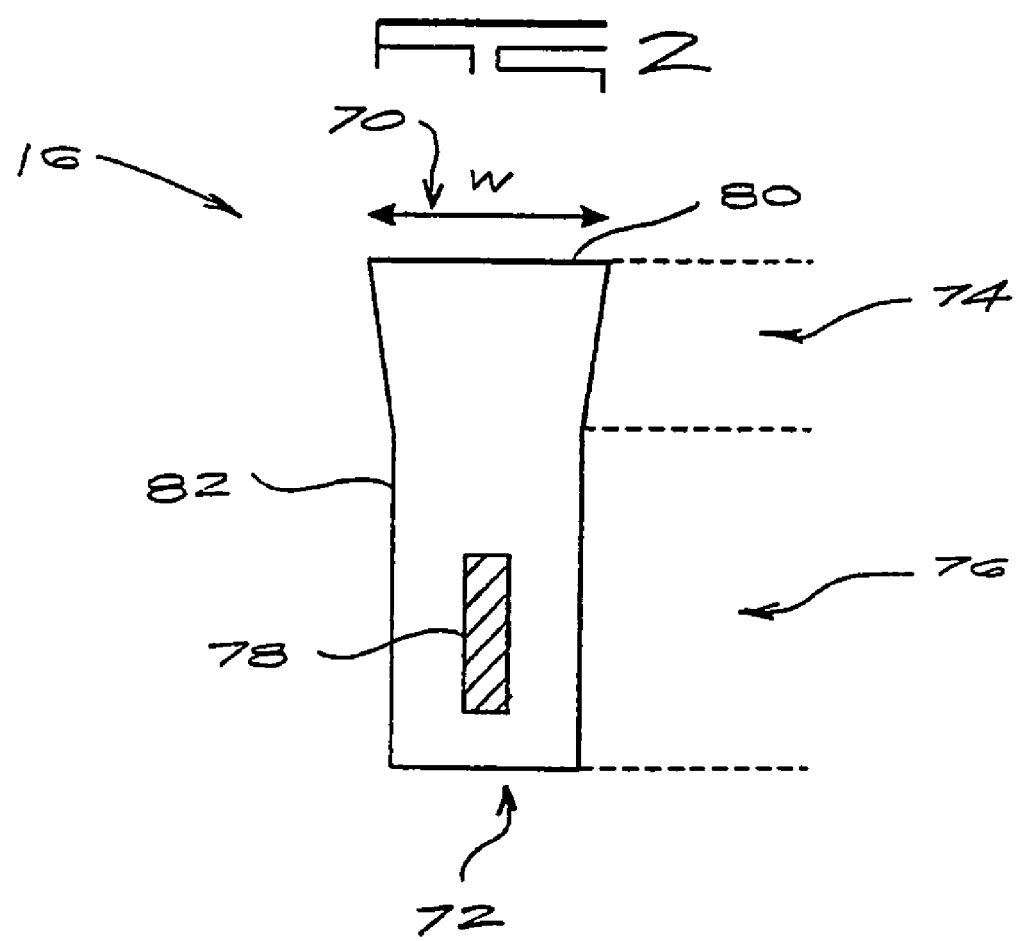

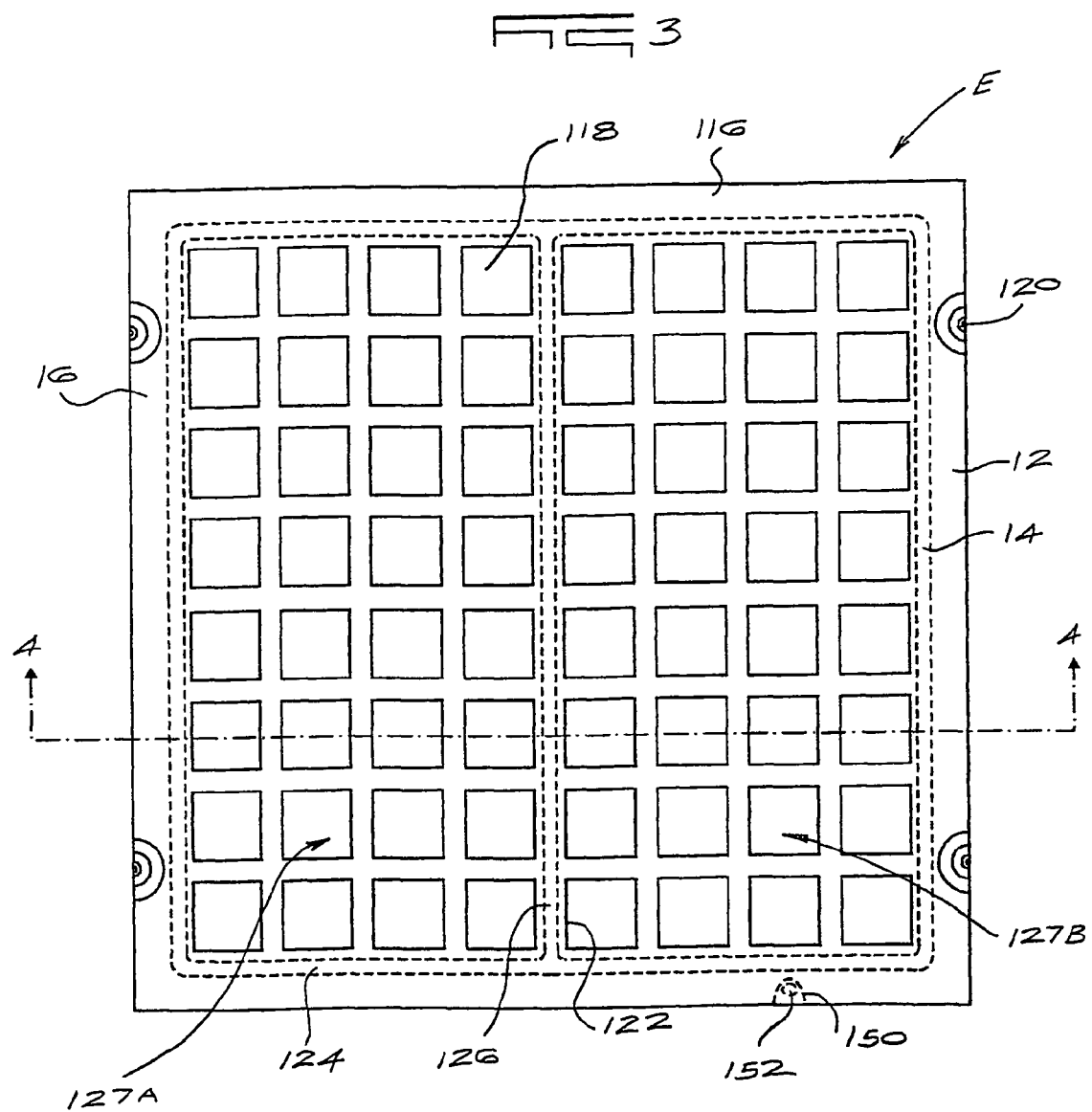

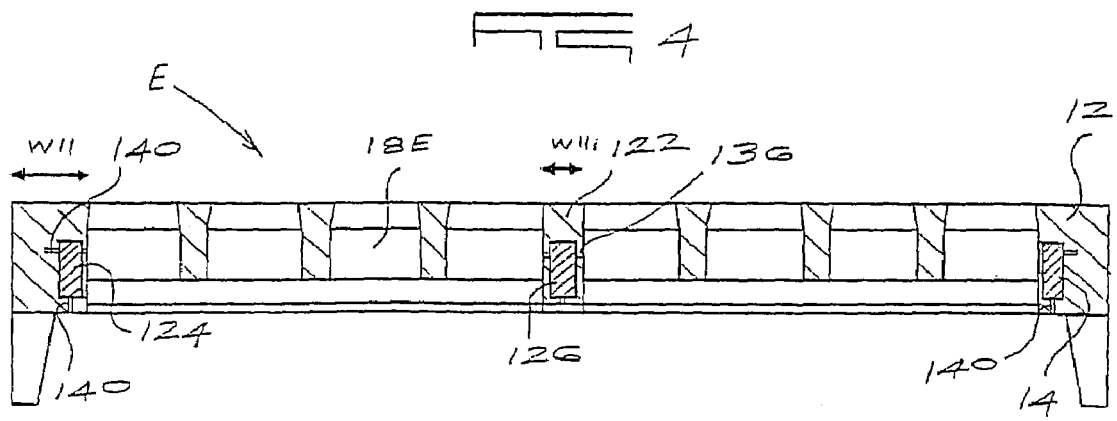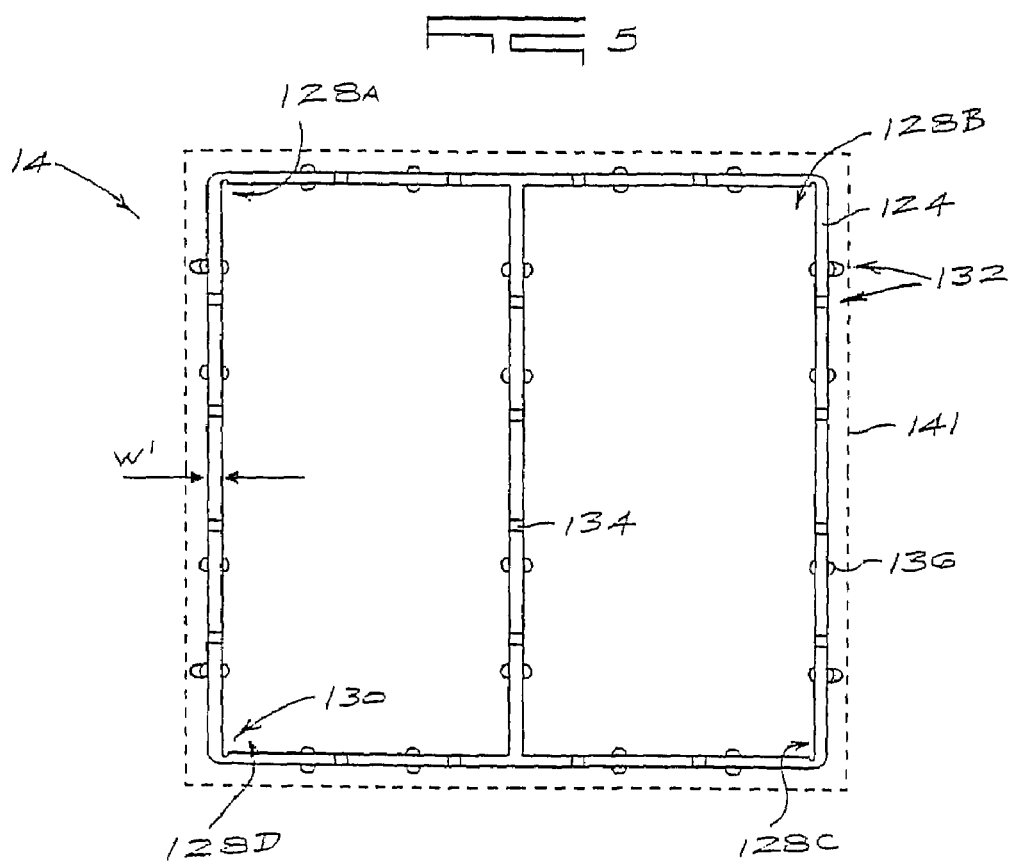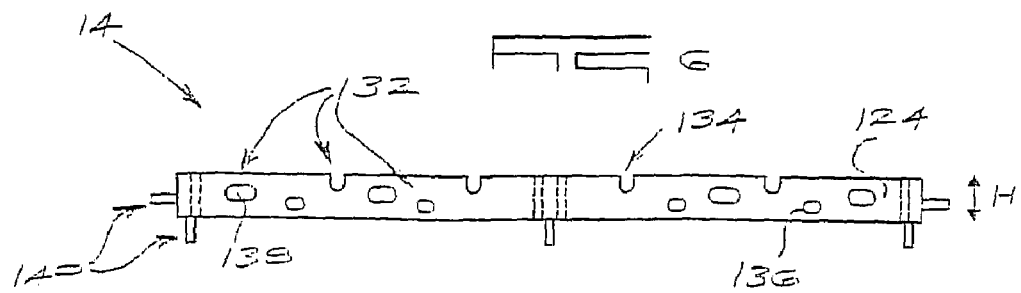

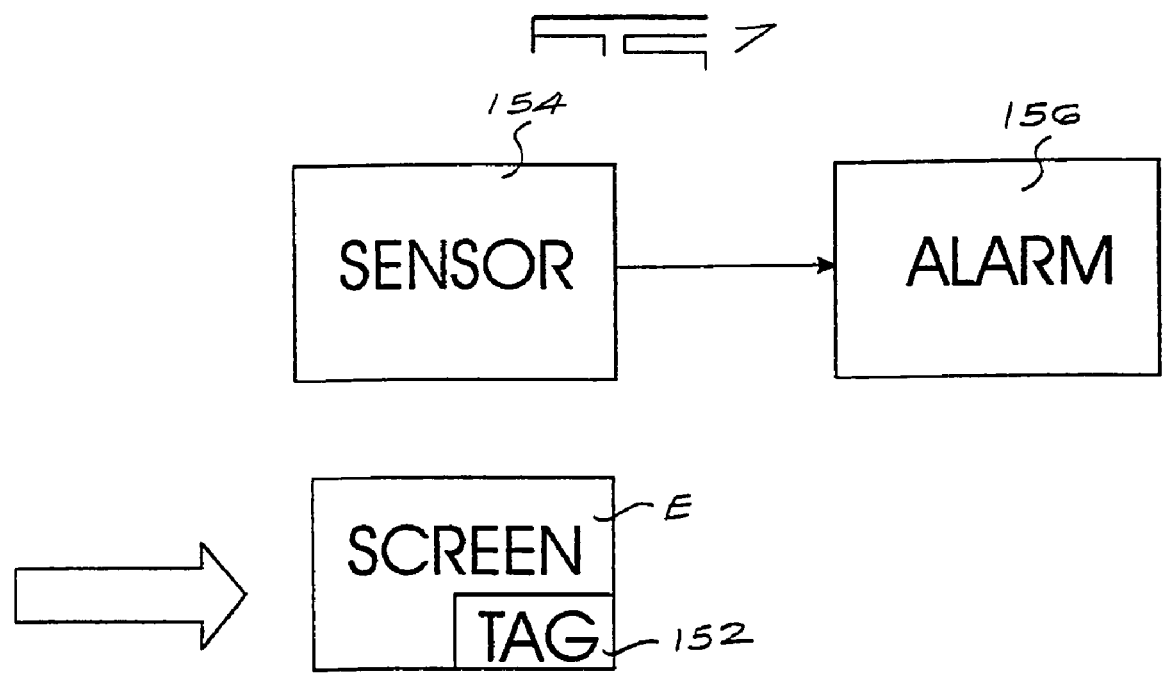

SCREENING ELEMENT

BACKGROUND OF THE INVENTION

This invention relates to a screening element for use in the construction of modular screening decks used for the screening of particulate materials.

It is known to manufacture a screening element, from a synthetic plastics material, with a plurality of screening apertures which are in communication with one another. This allows the apertures to expand and this, at least to some extent, prevents the blocking of the individual apertures by the material being screened and the blinding of the screening element.

The applicant is aware of a number of screening elements employing the general principles stated above. These known screening elements all have a plurality of rib formations which extend across the screening element. These rib formations are arranged side by side on the screening element to define the apertures between them. The apertures so formed are in a staggered configuration and each aperture is bordered by at least four sections, two each from two different rib formations. Each pair of sections is V-shaped and in combination forms a generally square aperture. In this manner the entire screening element is made up of apertures of the same square shape.

In order to screen the particulate materials effectively it may be beneficial to configure the rib formations in such a way that sections of the rib formations lie directly in the flow path of the particulate material. It is also important to control the rigidity and flexibility of the rib formations of the screening element.

The applicant is further aware that in certain screening elements that are manufactured from a synthetic plastics material the rib formations which define the apertures of the screening element are V-shaped in cross-section. In order to provide sufficient strength to the V-shaped elements substantial material is required.

It is also known, in order to provide strength to the plastics screen, to trap a metal frame within the plastics material. The metal frame is normally of mild steel and is formed from flat bar which is cut, bent and welded to form a frame of the required size and shape.

The manufacture of the metal frame is a laborious, labour intensive and multistep process. A large and robust frame adds significant weight to the screen.

During the manufacturing of the screen separate spacers are placed on the metal frame whereafter the plastics material is cast or injection moulded around the metal frame. In this manner the metal frame is trapped inside the plastics material.

As a result of the characteristics of the plastics material and the metal frame no direct bonding occurs between the plastics material and the metal frame. Heat from the plastics material, during the casting or injection moulding process, is transferred to the metal frame and if the size and width of the metal frame are not within specific parameters, warpage, bending and distortion of the metal frame occur as a result of the heat. In practice it has been found that a metal frame having a width of at least 8 mm and a height of 12 mm successfully withstands the heat from the plastics material. The minimum width of the metal frame results in broad sections of the screen having to be reserved for the metal frame which results in a loss of screening area.

The metal frame is further susceptible to oxidation in harsh environments.

During use of the screen, wear of the plastics material results in the eventual exposure of the metal frame. Once the metal frame is exposed the plastics material is easily dislodged from the metal frame which can result in the catastrophic failure of the screen.

During the recovery of a used screen it is also difficult and costly to recover the metal of the frame for re-use in subsequent metal frames.

It has further been found that when the screen is subjected to impact the metal frame often bends and distorts the screen. This could affect the productivity of the screen.

A further problem associated with all screens is the fact that if the screen is dislodged from a fixed structure supporting it the failure of the screen often goes unnoticed which results in defective screening taking place. If the dislodged screen is transported away from the screening area substantial production time could be wasted in the recovery of the screen and the re-screening of the affected material.

SUMMARY OF THE INVENTION

The invention aims to alleviate at least some of the aforementioned problems and to provide a screening element and a frame for a screening element which could be used as an alternative to known screens and frames, and to methods for the manufacture thereof.

The invention provides a screening element which includes a body with an upper screening surface, a lower discharge surface, a plurality of beam formations each of which extends at least partially across the body, at least a first plurality of apertures in the body defined by the beam formations and a reinforcing frame which is at least partially embedded in the body, which frame is made of a first plastics material.

The frame may be rectangular in outline and may define at least one rectangular opening with a plurality of inner corners. At least one of the inner corners may be curved or may be slotted to provide an expansion point. The frame may include at least one cross member.

Preferably the first plastics material is a material known by the trade name DURATHANE BKV30™.

A plurality of keying formations may be formed on the frame. Each of the keying formations may be in the form of a groove, spigot or aperture.

A plurality of spacers may also be integrally formed on the frame.

The frame may have, in cross-section, a slenderness ratio of between 2:5 and 2:3 and preferably the slenderness ratio is in the order of 2:4.

The body may be made of a second plastics material and the first plastics material preferably has a greater density than the second plastics material. The second plastics material may be polyurethane The body may include a plurality of location formations.

A tag may be located in the body. The term "tag" is used in this specification in relation to any electronic, metal or other device the presence or absence of which can be detected by a sensor, such as for example an electronic signature device, a transponder or an isotope. Preferably the tag is in the form of an electronic device.

In cross-section at least one beam formation may include a tapered section and a support section. The tapered section may have an enlarged base facing towards the screening surface and a narrow neck facing towards the discharge surface. The support section may be attached to the neck of the tapered section. The support section may include a reinforcing insert.

Preferably the tapered section and the support section are integrally formed.

The tapered section may have a reducing taper from the screening surface towards the discharge surface and the support section may be located between the tapered section and the discharge surface.

The first plurality of apertures may be in communication with one another and may be of a first shape.

A second plurality of apertures may be defined between at least two of the beam formations and the second plurality of apertures may be in communication with one another. Each of the second plurality of apertures may be of a second shape.

The first and second shapes may be different from one another and may be selected from a square shape, hexagonal shape or octagonal shape.

The invention also provides that the screening element has a plurality of first cross members extending from at least one beam formation in a first direction and a plurality of second cross members extending from the one beam formation in a second direction which is opposite to the first direction, each of the second cross members being directly opposite a respective first cross member.

The first and second cross members may each extend at a right angle from the one beam formation.

In an alternative form of the invention each beam formation has a screening formation with a first screening section which extends in a first direction, a second screening section attached to the first screening section which extends in a second direction which is different from the first direction, a third screening section attached to the second screening section which extends in a third direction which is opposite to the first direction and a fourth screening section attached to the third screening section which extends in the second direction.

Each of the first plurality of apertures may be rectangular in outline and preferably each of the first plurality of apertures is square in outline.

Each of the first plurality of apertures may be bordered on three of its four sides by the first, second and third screening sections.

Preferably the second direction is at a right angle to the first direction.

The invention additionally provides a screening system which includes a screening element with a tag and a sensor for monitoring the presence or absence of the tag. The screening system may include an alarm and the sensor may provide an output to the alarm.

The invention further provides a method of manufacturing a frame for a screening element which includes the step of forming a frame body from a first plastics material. The frame body may be formed in an injection molding step and the first plastics material may be a material known by the trade name DURATHANE BKV30™.

The method may include the step of forming a plurality of keying formations on the frame body. Each of the keying formations may be in the form of a groove, spigot or aperture.

The method may include the step of integrally forming a plurality of spacers on the frame body.

The frame body may be rectangular in outline and may define at least one rectangular aperture with a plurality of inner corners.

The method may include the step of forming a slot in at least one of the inner corners.

The invention also provides a process for the manufacturing of a screening element which includes the steps of:

(a) forming a frame from a first plastics material; and
(b) molding a screen body from a second plastics material at least partially around the frame.

Preferably the frame is molded in a first injection molding step and the screen body is molded in a second injection molding step.

The first plastics material preferably has a greater density than the second plastics material. The first plastics material may be known by the trade name DURATHANE BKV30™ and the second plastics material may be polyurethane.

The frame may be placed in a dieset wherein the screening body is injection molded.

BRIEF DESCRIPTION OF THE DRAWINGS

The invention is further described by way of examples with reference to the accompanying drawings in which:

FIG. 1 is a plan view of a screening deck consisting of screening elements A, B, C and D according to the invention;

FIG. 2 is an enlarged cross-sectional view on any of the lines 2-2 through beam formations of the screening elements of FIG. 1;

FIG. 3 is a plan view of another screening element illustrating a different aspect of the invention;

FIG. 4 is a sectioned side view on the line 4-4 of the screening element of FIG. 3;

FIG. 5 is a plan view of a frame according to the invention used in the screening element of FIG. 3;

FIG. 6 is a side view of the frame of FIG. 5; and

FIG. 7 is a diagrammatical representation of a screening system according to another aspect of the invention.

DESCRIPTION OF PREFERRED EMBODIMENTS

FIG. 1 illustrates a screening deck 10 which consists of a screening element A, a screening element B, a screening element C and a screening element D fitted together in a known modular fashion. Each of the screening elements A, B, C and D has a body 12, a frame 14 at least partially embedded in the body 12 and a plurality of beam formations 16 which extend across the body 12. A plurality of screening apertures 18 which are in communication with one another are formed between at least two of the beams 16. The screening elements A to D are manufactured from an appropriate plastics material and are injection molded in a known manner. Each of the screening elements A to D illustrates a different form of the invention.

The screening element A has a first set of apertures 20 of a first shape defined between a first beam formation 22 and a second beam formation 24. A second set of apertures 26 of a second shape is defined between the second beam 24 and a third beam 28. The first and second shapes differ as each aperture 20 has a hexagonal shape and each aperture 26 has an octagonal shape. The first set of apertures 20 and the second set of apertures 26 are staggered relatively to one another.

By combining the different shapes of apertures the screening characteristics of the screening element A can be varied according to requirements.

The screening element B has a plurality of octagonal shaped apertures 18B defined between pairs of beams 16B. The various apertures defined by the plurality of beams 16B are of the same size and octagonal shape.

The apertures 18C of the screening element C are of a square shape. Each of the beams 16C has a number of first cross members 32 which extend in a first direction 34 as well as a number of second cross members 36 which extend in a second direction 38 which is opposite to the first direction 34. Each of the second cross members 36 extends from a beam 16C at a position 39A which is directly opposite to a position 39B on the beam 16C from which the respective first cross member 32 extends. The intersection of each of the first cross members 32, second cross members 36 and the beam 16C is thus cross-shaped. Each of the first and second cross members 32, 36 extends at a right angle to the beam 16C. Each of the apertures 18C is in communication with an adjacent aperture 18C by way of passages 40C between each set of beams 16C.

Each of the beams 16D of the screening element D has a number of screening formations 42. Each screening formation 42 consists of a first screening section 44 which extends in the first direction 34, a second screening section 46 which is attached to the first screening section 44 and extends in a third direction 48 which is different from, and in this example at a right angle to, the first direction 34, a third screening section 50 which is attached to the second screening section 46 and extends in the second direction 38 and a fourth screening section 52 which is attached to the third screening section 50 and extends in the third direction 48.

As each of the beams 16D is formed from a number of the screening formations 42, alternating, opposite facing, cup-shaped troughs 54 are formed on each beam 16D.

Rectangular apertures 18D are thus formed between adjacent beams 16D and each aperture 18D is bordered on three of its four sides by the first, second and third screening sections 44, 46, 50. Adjacent apertures 18D are in communication with one another through passages 40D defined between the adjacent beams 16D.

The apertures 18C and 18D are not in a staggered configuration as the apertures 18A and 18B but are situated directly next to one another.

The beams 18C and the cross members 32, 36 and the beams 18D and the screening sections 44, 46, 50, 52 respectively together form barriers which, in use, lie directly across the flow path of a particulate material (not shown) being screened on the screening elements C, D.

As is shown in FIG. 2 the screening deck 10 has an upper screening surface 70 and a lower discharge surface 72. In cross-section each of the beams 16 is of an integrally formed two-part construction. Each beam 16 has a first tapered section 74 and a second rectangular support section 76 attached to the tapered section 74. The tapered section 74 has a base 80 at the screening surface 70 and a neck 82 facing towards the discharge surface 72. The tapered section 74 has a reducing taper from the base 80 at the screening surface 70 towards the neck 82 facing the discharge surface 72. The support section 76 is attached to the neck 82 and is located between the neck 82 and the discharge surface 72. The support section 76 is reinforced by a reinforcing insert 78. The reinforcing insert 78 is of any appropriate material.

The support section 76 supports the tapered section 74 and the two part construction of the beams 16 allows for a reduction of the width W of the base 80 without compromising the screening ability and strength of the screening elements A to D. This can result in a reduction of material use.

It is to be understood that the different screening elements A to D are used for different applications and that the reinforcing insert 78 can be omitted in applications where the support section 76 provides sufficient strength and support to the beams 16.

FIG. 3 and 4 show a screening element E. The frame 14, which is at least partially enveloped by the body 12, is shown in dotted outlines. The body 12 is rectangular in outline and has a border 116 which surrounds the plurality of screening apertures 18E formed in the body 12. A number of location formations 120 are formed in the border 116. The apertures 18E and location formations 120 are of known construction and are not further described.

The screening element E also has a support section 122 which extends across the body 12.

The frame 14 has a rectangular frame body 124 with a cross member 126 which extends across the frame body 124 to define two rectangular openings 127A, B in the frame body 124. The frame body 124 and the cross member 126 are respectively located within the border 116 and the support section 122.

The frame body 124 is made from a first plastics material which, in this example, is sold under and known by the trade name DURATHANE BKV30™, (Polyamide 6, or Nylon, a Thermoplastic), and the body 12 is made from a second plastics material which, in this example, is polyurethane. The first plastics material has a greater density that the second plastics material which makes it more robust and resistant against deformation and bending than the second plastics material.

As is shown in FIGS. 5 and 6 the frame body 124 defines a plurality of inner corners 128A, B, C, D. Each of these inner corners 128A, B, C, D has a slot 130 formed in the frame body 124.

A plurality of keying formations 132 are integrally formed with the frame body 124. The size and shape of the keying formations 132 depend on the application of the frame 14 and in this example are in the form of grooves 134, spigots 136 and apertures 138.

A plurality of spacers 140 are also integrally formed with the frame body 124.

The frame 14 is manufactured in a first injection molding process during which the slots 130, the keying formations 132 and the spacers 140 are all integrally formed in and on the frame body 124.

The frame 14 is thereafter placed in a dieset 141 (shown in dotted outlines in FIG. 5) in such a manner that the spacers 140 which are on the sides and bottom of the frame 14 abut the sides and floor of the dieset 141. The body 12 is thereafter injection molded or alternatively is cast around the frame 14 so that the frame 14 is embedded within the body 12.

After the screening element E is removed from the dieset a cavity 150 (see FIG. 3) is formed in the body 12 wherein an electronic tag 152 is placed. The cavity 150 is plugged so that the electronic tag 152 is trapped within the body 12.

The electronic tag 152 is of known construction and is not further described.

In use the screening element E is attached to a fixed structure (not shown) making use of the location formation 120 whereafter the screening element E is used for the screening of particulate material (not shown) in a known manner.

As the body 12 wears down as a result of the abrasive forces of the particulate material acting on the screening element E the frame 14 is eventually exposed. The keying formations 132 prevent the body 12 from disengaging from the frame 14. In particular the grooves 134 and the apertures 138 allow for the second plastics material of the body 12 to bridge the frame 14. In this way the working life of the screening element E is extended and the screening element E can be used for an extended period although the frame 14 is exposed.

As the frame 14 is of a plastics material abrasion of the frame 14 is less than is the case with a frame from mild steel.

The frame 14 is further flexible and does not bend permanently as is the case with the prior art metal frames. The screening element E is therefore capable of substantial shock absorption.

The integrally formed spacers 140 further negate the need for separate spacers in order to locate the frame 14 in the dieset 141.

As is shown in FIGS. 5 and 6 the sides of the frame 14 has a width W' which is 6 mm and a height H which is 15 mm. The frame 14 thus has a slenderness ratio of 3:5. The applicant has found that the slenderness ratio of the frame 14 could even be in the order of 2:5 and still resist warpage and deformation as a result of heat from the second plastics material and a slenderness ratio of 2:4 is ideal.

This smaller slenderness ratio of the frame 14 allows for the reduction of a width W" and W" of the border 116 and the support section 122 compared with prior art screening elements. This reduction in width W" in turn allows for more screening area wherein screening apertures 18E can be formed. Less material is thus also required for the plastics frame 14.

The plastics frame 14 is less susceptible to oxidation than the prior art metal frames.

Each slot 130 forms a heat expansion point and protects the frame 14 from warpage when the frame 14 is exposed to heat from the second plastics material. In an alternative construction of the frame 14 each inner corner 128A, B, C, D is curved to provide an expansion point.

The steps involved in the manufacture of the frame 14 are less than with the prior art metal frames as there is no need for cutting, bending and welding of the frame sections. The frame 14 is also lighter than the prior art metal frames which improves the handling of the screening element E. The injection molding of the frame 14 further allows for frames 14 of various shapes and sizes to be manufactured with relative ease.

A further advantage of the plastics frame 14 is in the recovery of used screening elements E. The first plastics material of the frame 14 is recovered in a known manner for the manufacture of a new frame 14 and the remainder of the second plastics material of the screen body 12 is recovered in a known manner for the molding of a new screen body 12. In this manner the whole used screen 10 is recovered and material wastage is reduced to a minimum.

The reduction in manufacturing steps, the increased working life, effectiveness and the recoverability of the screening element E have obvious cost benefits.

It is to be understood that the frame 14 can be made in various shapes and sizes with any number of cross members 126 depending on the application of the screening element E.

In addition to the mechanical lock provided by the keying formations chemical binding agents are used if required to form a bond between the frame 14 and the body 12. This chemical bond further extends the working life of the screening element E.

In use when the screening element E is dislodged from the fixed structure the screening element E is often caught on the conveyance for the screened particulate material and the further screening of the particulate material is compromised. A sensor 154 (see FIG. 7) is placed on the downstream side of the fixed structure to locate any electronic tags 152 which should pass its location. As the dislodged screening element E passes the sensor 154 the presence of the electronic tag 152 is detected and an output is provided by the sensor 154 to an alarm 156. The alarm 156 is thus raised and the flow of the particulate material is stopped. This allows manual inspection, removal and repair of the dislodged screening element E with the minimum disruption to the screening process and minimum wastage of screening time.

Alternatively the sensor 154 is used to monitor the presence of the tag 152 and screening element E at its point of installation on the fixed structure. If the tag 152 or the screening element E is dislodged from the fixed structure the tag 152 moves away from its point of installation. The absence of the tag 152 is detected by the sensor 154 and the alarm 156 is raised.

It is important to note that various of the features shown in FIGS. 1 to 7 and described herein can be combined, depending on requirements, in a single screening element.

The invention claimed is:

1. A screening element which includes a body with an upper screening surface, a lower discharge surface, a plurality of beam formations each of which extends at least partially across the body, at least a first plurality of apertures in the body defined by the beam formations, an integrally formed unitary reinforcing frame which is at least partially embedded in the body aid which is entirely made of a first plastics material, and a plurality of spacers which are integrally formed on the frame and at least partially embedded in the body, wherein the frame is rectangular in outline and defines at least one rectangular opening.

2. A screening element according to claim 1 wherein the frame includes at least one cross member.

3. A screening element according to claim 1 which includes a plurality of keying formations on the frame.

4. A screening element according to claim 3 wherein each of the keying formations is in the form of a groove, spigot or aperture.

5. A screening element according to claim 1 wherein the frame, in cross-section has a slenderness ratio of between 2:5 and 2:3.

6. A screening element according to claim 5 wherein the slenderness ratio is 2:4.

7. A screening element according to claim 1 wherein the body is made from a second plastics material.

8. A screening element according to claim 1 wherein the body includes a plurality of location formations.

9. A screening element according to claim 1 which includes a tag which is located in the body.

10. A screening element according to claim 1 wherein at least one beam formation, in cross-section includes a tapered section and a support section.

11. A screening element according to claim 10 wherein the support section includes a reinforcing insert.

12. A screening element according to claim 10 wherein the tapered section has a reducing taper from the screening surface towards the discharge surface and the support section is located between the tapered section and the discharge surface.

13. A screening element according to claim 1 wherein the first plurality of apertures are in communication with one another.

14. A screening element according to claim 1 which includes a plurality of first cross members which extend, from at least one beam formation in a first direction and a plurality of second cross members which extend from the one beam formation in a second direction which is opposite to the first direction, each of the second cross members being directly opposite a respective first cross member.

15. A screening element according to claim 1 wherein each beam formation includes a screening formation with a first screening section which extends in a first direction, a second screening section attached to the first screening section which extends in a second direction which is different from the first direction, a third screening section attached to the second screening section which extends in a third direction which is parallel to the first direction and a fourth screening section attached to the third screening section which extends parallel to the second direction.

16. A screening element according to claim 15 wherein the second direction is at a right angle to the first direction.

* * * * *